(12) United States Patent
Batenev et al.

(10) Patent No.: US 11,218,551 B1
(45) Date of Patent: Jan. 4, 2022

(54) METHOD AND SYSTEM FOR USER IDENTIFICATION BASED ON USER ENVIRONMENT

(71) Applicant: Group IB, Ltd, Moscow (RU)

(72) Inventors: Aleksandr Viktorovich Batenev, Mamontovka (RU); Pavel Vladimirovich Krylov, Moscow (RU)

(73) Assignee: GROUP IB, LTD, Moscow (RU)

( * ) Notice: Subject to any disclaimer, the term of this patent is extended or adjusted under 35 U.S.C. 154(b) by 0 days.

(21) Appl. No.: 17/230,242

(22) Filed: Apr. 14, 2021

(30) Foreign Application Priority Data

Oct. 14, 2020 (RU) .................................. 2020133675

(51) Int. Cl.
*G06F 15/16* (2006.01)
*H04L 29/08* (2006.01)

(52) U.S. Cl.
CPC .......... *H04L 67/146* (2013.01); *H04L 67/025* (2013.01); *H04L 67/22* (2013.01); *H04L 67/2804* (2013.01); *H04L 67/306* (2013.01); *H04L 67/34* (2013.01)

(58) Field of Classification Search
CPC combination set(s) only.
See application file for complete search history.

(56) References Cited

U.S. PATENT DOCUMENTS

| 8,510,820 B2 | 8/2013 | Oberheide et al. |
| 9,154,388 B2 | 10/2015 | Savage et al. |
| 2012/0198535 A1* | 8/2012 | Oberheide .......... H04L 63/0807 726/9 |
| 2015/0006384 A1 | 1/2015 | Shaikh |
| 2015/0372888 A1* | 12/2015 | Savage .................. H04L 67/42 709/203 |

FOREIGN PATENT DOCUMENTS

| JP | 2011257810 A | 12/2011 |
| JP | 5581820 B2 | 9/2014 |
| RU | 2607990 C1 | 1/2017 |

OTHER PUBLICATIONS

Search Report with regard to the RU Patent Application No. 2020133675 completed on Mar. 3, 2021.
English Abstract for JP2011257810/JP5581820B2 retrieved on Espacenet on Apr. 14, 2021.

* cited by examiner

*Primary Examiner* — Normin Abedin
(74) *Attorney, Agent, or Firm* — BCF LLP

(57) ABSTRACT

A method and a system for user identification of a user based on a current user environment of a user device thereof are provided. The method comprises: causing the user device to receive an analytical module for installation thereof in a web application, the analytical module being configured to execute: causing installation of an iframe container in a given page of the web application launched on the user device; retrieving at least one cookie file including user data indicative of the current user environment of the user device; transmitting the at least one cookie file to an identification server for modification thereof to generate an in-use cookie file; and receiving the in-use cookie file; analyzing the in-use cookie file for identifying, based on the user data, the user device, and in response to identifying the user device as being compromised, transmitting a predetermined notification to the application content server.

12 Claims, 5 Drawing Sheets

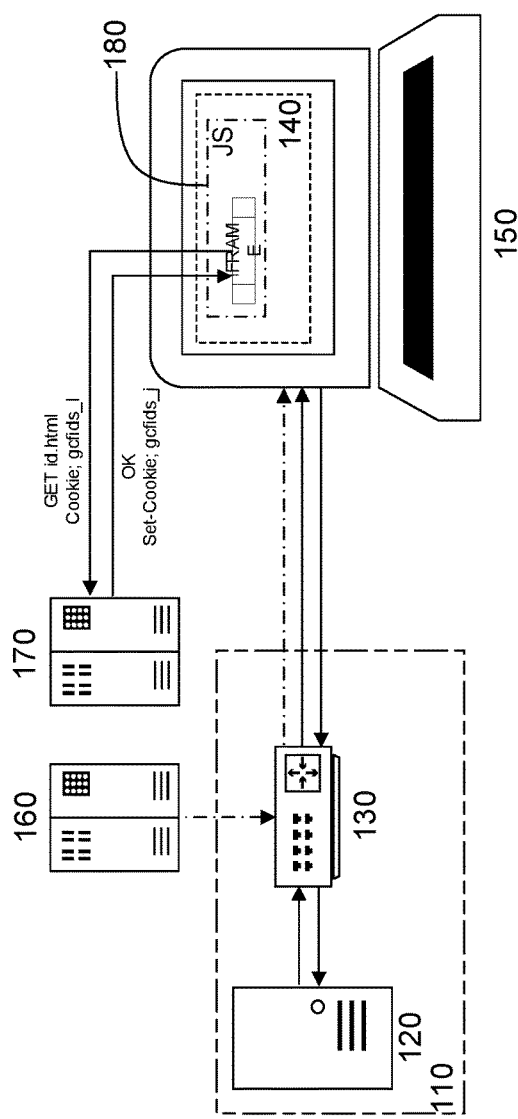
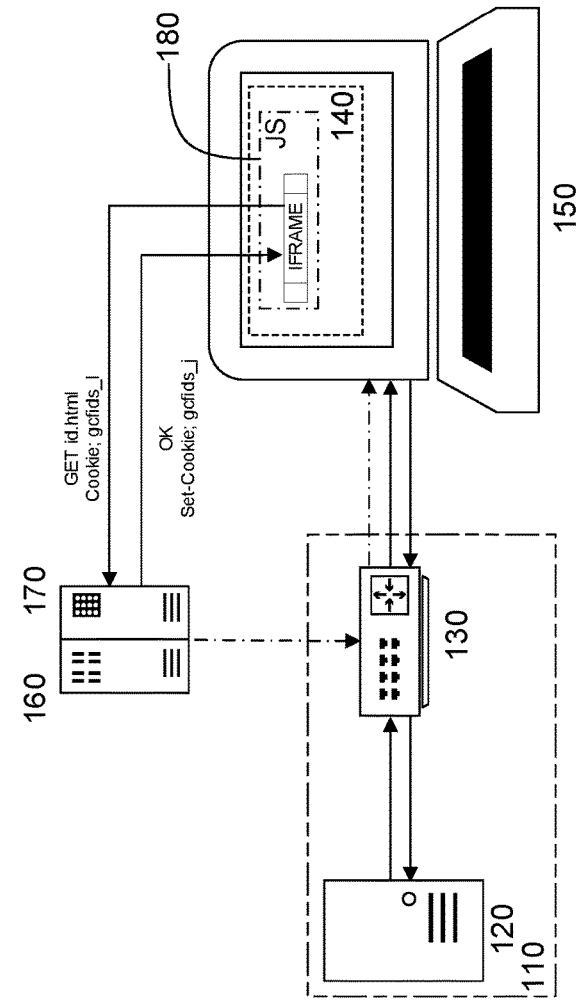
FIG. 2A
FIG. 2B

METHOD AND SYSTEM FOR USER IDENTIFICATION BASED ON USER ENVIRONMENT

CROSS-REFERENCE

The present application claims priority to a Russian Patent Application No.: 2020133675, entitled "METHOD AND SYSTEM FOR USER IDENTIFICATION BASED ON USER ENVIRONMENT", filed on Oct. 14, 2020, the entirety of which is incorporated herein by reference.

FIELD

The present technology relates broadly to the field of information security; and in particular, to a method and system for user identification.

BACKGROUND

As it may become apparent, financial technology (Fin-Tech) industries (such as the bank industry, and the like) may be one of IT industries most vulnerable to cyber attacks, as they may provide an easier way for criminals to derive monetary benefits.

Certain information security experts note that factors facilitating cyber attacks in a given financial technology system, such as a banking system, for example, may include deferred receipt of client information about a user in the course of providing financial services to them, insufficient amount of the client information, ineffective processes for verification of the client information via information sources, and others. This may be caused by unreliability and bias, to certain extent, in information associated with the user used, by the banking system, for decision-making in respect of providing/restricting access to its services.

Thus, one approach to tackling the problems described above is determining unbiased and reliable data associated with the user which can unambiguously allow identifying actions of a real user associated with the client device from a cyber attack, before providing access to certain services.

Certain prior art approaches have been proposed to tackle the above-identified technical problem.

U.S. Pat. No. 9,154,388-B2 issued on Oct. 6, 2015, assigned to Google LLC, and entitled "Data Delivery" discloses methods, systems, and apparatus, including computer programs encoded on a computer storage medium, for support dependent post delivery. In one aspect, a method included generating transmission data for a web page served by a first server and rendered on the client device, the first server belonging to a first domain; determining if the client device supports cross origin resource sharing; in response to a determination that the client device does not support cross origin resource sharing: defining an iFrame for the web page, the iFrame belonging to a second domain of a receiving server, and having a name value derived from the transmission data, receiving iFrame instructions from the receiving server and executing the iFrame instructions in the iFrame, the iFrame instruction causing the client device to: generate an HTTP POST request to the receiving server from the iFrame name value, the first HTTP POST request including the transmission data.

Japanese Patent No.: 5,581,820-B2 issued on Sep. 3, 2014, entitled "Relay Server Device, Cookie Control Method, and Cookie Control Program" discloses a resource identifier replacement unit that replaces the resource identifier of the request when a response from the server to the browser is relayed; a cookie replacement unit that replaces the cookie writing instruction information with script call information when receiving the cookie writing instruction information for the browser from the server. For the script call information replaced by the cookie replacement unit, a frame corresponding to the ancestor domain of the request destination domain of the browser is created, and a cookie write instruction corresponding to the ancestor domain is transmitted to the frame by cross-domain communication.

U.S. Pat. No. 8,510,820-B2 issued on Aug. 13, 2013, assigned to Duo Security Inc, and entitled "System and Method for Embedded Authentication" discloses systems and methods of embedded authentication. One method of the preferred embodiment can include receiving at an authentication server a transaction token from a host website, the host website including an embeddable interface and prompting a user challenge by the authentication server at the embeddable interface. The method of the preferred embodiment can also include creating a signed authentication token in response to a successful user challenge, and transmitting the signed authentication token from the authentication server to the embeddable interface.

SUMMARY

It is an object of the present technology to provide a system and method for ameliorate at least some inconveniencies present in the prior art.

Developers of the present technology have appreciated that information security in the banking system may be improved if the user could be identified by data specific to the client device thereof and its environment. Such data may include, without limitation, data associated with web applications installed on the client device, such as a browser application, user settings thereof indicative of a current user environment of the client device, data of user behavioral habits—such as those of using the keyboard, preferred languages, and the like.

Thus, the developers have devised methods and systems for dynamic identification of global user environment allowing, unlike the prior art approaches, identifying and storing data of compromised client devices that may further be used for detecting future cyber attacks on the banking system more effectively.

More specifically, in accordance with a first broad aspect of the present technology, there is provided a method for user identification of a user based on a current user environment. The method is executable by a server including a processor communicatively couplable, via a communication network, with a user device of the user. The method comprises: in response to receiving, from an application content server, an indication of launching a web application on the user device of the user, causing, by the processor, the user device to receive an analytical module for installation thereof in a web application of the user device, the analytical module being configured to execute: causing installation of an iframe container in a given page of the web application; retrieving, from the user device, at least one cookie file including user data indicative of a current user environment of the user device; transmitting, via the iframe container, the at least one cookie file to at least one identification server for modification thereof to generate an in-use cookie file; and receiving, by the processor, the in-use cookie file; analyzing, by the processor, the in-use cookie file for identifying, based on the user data, the user device, the identifying including at least one of a global identification on a third-level domain and a local identification within a region on a fourth-level domain; in response to identifying the user device as being compromised, transmitting a predetermined notification to the application content server for taking respective measures in respect of further user interactions from the user device with the web application.

In some implementations of the method, the modification of the at least cookie file comprises adding a time stamp to the at least one cookie and further re-encryption thereof.

In some implementations of the method, the iframe container is installed in the given page outside of an authorized zone of the web application.

In some implementations of the method, the iframe container is configured for cross-domain exchange of cookie files.

In some implementations of the method, the at least one cookie file is further analyzed on a global data analysis server for generating a global identification profile of the current user environment of the user device.

In some implementations of the method, the global identification profile includes data indicative of at least one of: data of digital fingerprints of the web application, network features of the communication network, and user behavioral habits of the user.

In some implementations of the method, the data of the digital fingerprints of the web application includes information of at least one of: a User-Agent application on the user device, time of a system clock of an operating system installed on the user device, a CPU and a GPU of the user device, a monitor resolution and window size associated the web application, a list of fonts installed in the operating system, a list of all plugins installed in the operating system, and web application extensions in the web application.

In some implementations of the method, the data of the network features of the communication network includes at least one of: information of a local network architecture and information of settings of network protocols.

In some implementations of the method, the data of the user behavioral habits of the user include at least one of: a preferred interface language of the operating system, an operating system encoding and a time zone, data in a cache of the web application on the user device and log history thereof, mouse gestures, frequency and duration of keystrokes, data from an accelerometer of the user device, changes to standard fonts and sizes thereof of the web application, changes to a standard scale of the web application and/or elements thereof, use of special features including at least one of: text colors, size, data of settings of the web application including data of at least one of: blocking of third-party cookies, DNS prefetching, pop-up blocking, and Flash security settings.

In some implementations of the method, the analytical module is a Java Script module.

In some implementations of the method, the application content server is further configured to restrict the further user interactions from the user device with the web application.

In accordance with a second broad aspect of the present technology, there is provided a system for user identification of a user based on a current user environment. The system includes a server further including: a processor communicatively couplable, via a communication network, with a user device of the user and a non-transitory computer-readable medium storing instructions. The processor, upon executing the instruction is configured to: in response to receiving, from a application content server, an indication of launching a web application on the user device of the user, cause the user device to receive an analytical module for installation thereof in a web application of the user device, the analytical module being configured to execute: causing installation of an iframe container in a given page of the web application;

retrieving, from the user device, at least one cookie file including user data indicative of a current user environment of the user device; transmitting, via the iframe container, the at least one cookie file to at least one identification server for modification thereof to generate an in-use cookie file; and receive the in-use cookie file; analyze the in-use cookie file for identifying, based on the user data, the user device, the identifying including at least one of a global identification on a third-level domain and a local identification within a region on a fourth-level domain; in response to identifying the user device as being compromised, transmit a predetermined notification to the application content server for taking respective measures in respect of further user interactions from the user device with the web application.

In the context of the present specification, unless expressly provided otherwise, a computer system may refer, but is not limited to, a "computing device", an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Non-limiting embodiments of the present technology will be described with reference to the accompanying drawings, which are presented to explain the essence of the invention and in no way to limit the scope of the present technology, wherein:

FIGS. 2A and 2B depict schematic diagrams variants of implementation of a data analysis server and an identification server in the system of FIG. 1, in accordance with certain non-limiting embodiments of the present technology;

DETAILED DESCRIPTION

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Certain non-limiting embodiment of the present technology are directed to a computer-implemented method and system for user identification of a user, such as a user of a banking system, for example, based on a current user environment associated therewith.

Figure 1:
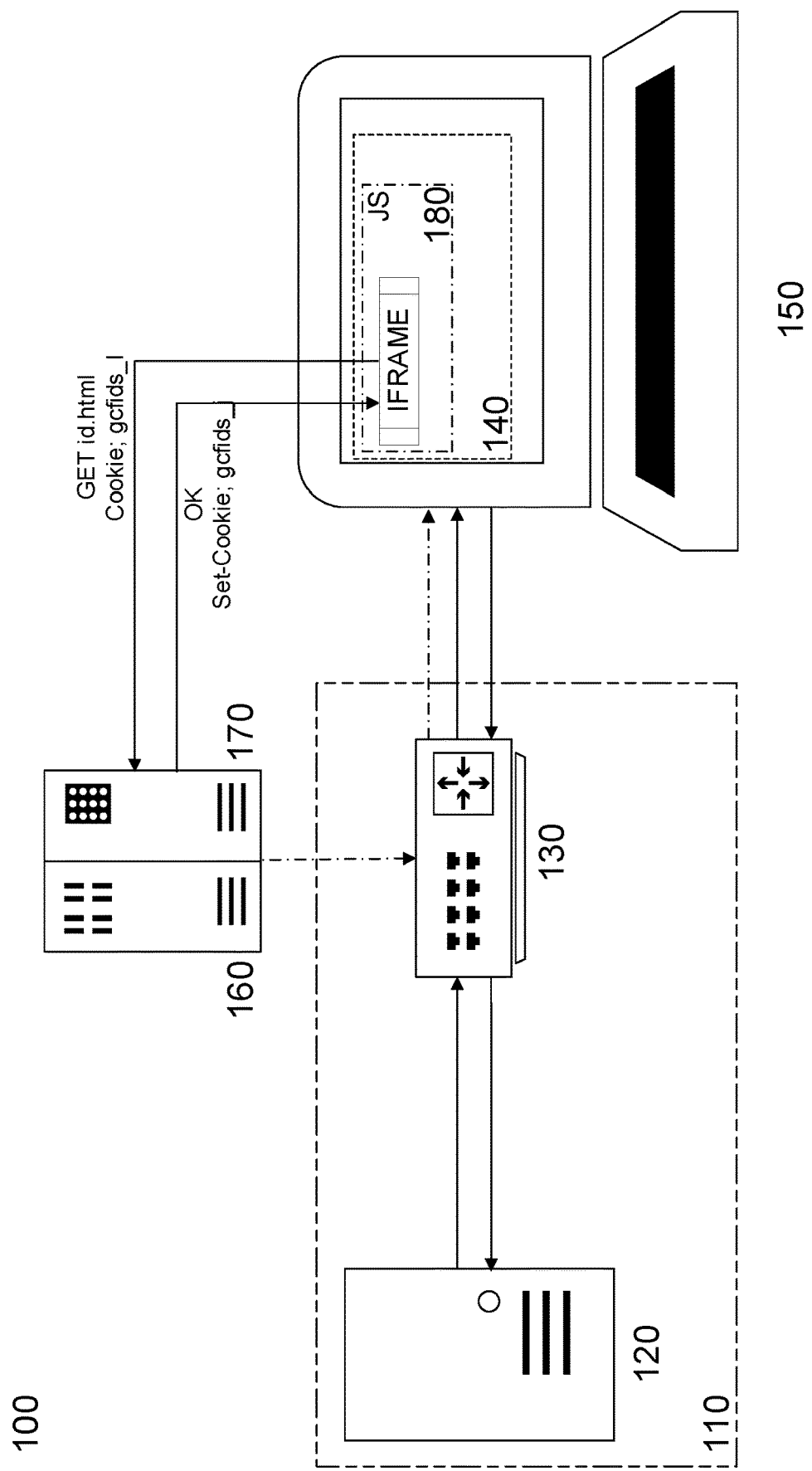
FIG. 1 depicts a schematic diagram of a system for user identification of a user based on a current user environment thereof, in accordance with certain non-limiting of the present technology.

With reference to FIG. 1, there is provided an example implementation of system 100 for the user identification of the user based on the current user environment associated therewith, in accordance with certain non-limiting embodiments of the present technology.

System

According to some non-limiting embodiments of the present technology, the system 100 may include an infrastructure of a web service provider 110, which may further include an application content server 120, a traffic balancer 130, and a web application 140.

In some non-limiting embodiments of the present technology, the application content server 120 may be a server of a financial technology system, such as a remote banking service (RBS), as an example. In some non-limiting embodiments of the present technology, the application content server 120 contains or has access to at least one storage of content elements or other information necessary to provide access to the RBS to users, or serves to process the website data. It is worth noting that the application content server 120 can be configured to serve millions of user connections/sessions simultaneously.

Further, in some non-limiting embodiments of the present technology, the system 100 may include users (not depicted) of the application content server 120, who may send request thereto via respective client devices, such as a client device 150 associated with the user. Various non-limiting examples of the client device 150 may include a stationary electronic device (e.g., a desktop computer, workstation, or IoT device) and/or a mobile device (e.g., a smartphone, tablet computer, laptop), configurable to execute a given task at hand, such as requesting access to services provided by the application content server 120, for example, via the web applications 140.

To that end, in some non-limiting embodiments of the present technology, the web application may include a browser application. However, in other non-limiting embodiments of the present technology, the web application may be a native application configured to provide access to at least one service of the application content server 120.

According to certain non-limiting embodiments of the present technology, the client device 150 can be coupled to the system 100 via direct channels and/or one or more networks or other common channels, which may include the Internet, intranets and/or other networks, and may include wired and/or wireless communication lines.

Further, in some non-limiting embodiments of the present technology, the system 100 may include a data analysis server 160 and an identification server 170, with which the application content server 120 can be communicatively coupled via respective communication lines.

It should be noted that, in some non-limiting embodiments of the present technology, each one of the application content server 120, the data analysis server 160, and the identification server 170 of the system 100 may be implemented as a conventional computer server and may thus comprise some or all of the components of the computing environment 500, which will be described below with reference to FIG. 5.

According to certain non-limiting embodiments of the present technology, the identification server 170 may be accessed by the web application 140 of the client device 150. For example, a client device identifier of the client device 150 may be obtained from the server identification 170 using a window.postMessage function, which may further be transferred to a main page of the web application 140 to be further transferred therefrom by an analytical module 180 to the data analysis server 160. Thus, client devices can be identified globally on a third-level domain, for example, id.group-ib.com, wherein a fourth-level domain *.id.group-ib.com, for example, sg.id.group-ib.com, is used for local identification of users within a particular region. Servers that correspond to *.id.group-ib.com domains may be disposed in a particular country or belong to a particular web service.

Further, in some non-limiting embodiments of the present technology, the data analysis server 160 may store an analytical module 180 that may be downloaded on the client device 150 at the beginning of operating the web application 140. As a non-limiting example, the analytical module may be a Java Script module (JSM).

Thus, after executing the analytical module 180 in the web application 140 of the client device 150, the data analysis server 160 can receive information about the capabilities of the current user environment associated with the client device 150 and generate a verdict based on the information received. For example, the verdict may be indicative of whether the client device 150 is currently used by the legitimate user or is compromised by a cyber attack targeting the application content server 120.

Although each one of the application content server 120, the data analysis server 160, and the identification server 170 are depicted as separate entities; in some non-limiting embodiments of the present technology, functionality of a given one of the application content server 120, the data analysis server 160, and the identification server 170 may be distributed among at least some thereof. Further, each one of the application content server 120, the data analysis server 160, and the identification server 170 may comprise a plurality of network computing devices that operate using a master/slave approach, whereby a given one of the network computing devices of the given one of the application content server 120, the data analysis server 160, and the identification server 170 can control and/or otherwise coordinate the operations of other network computing devices.

The application content server 120, the data analysis server 160, and the identification server 170 may operate, for example, as a plurality of network computing devices in a cluster architecture, peer-to-peer architecture, virtual machines, or in a cloud architecture. Further, with reference to FIG. 2, in some non-limiting embodiments of the present technology, the data analysis server 160 and the identification server 170 may comprise at least one single device (FIG. 2B) or separate distributed servers interacting over a communication network (FIG. 2A).

The functionality ascribed herein to the system 100 may be distributed among its components in an alternative manner, such as by merging or further separating the functions of one or more components, or may be distributed among another set of components. Thus, although only one non-limiting embodiment of a particular system component may be illustrated in FIG. 1, it should be understood that other combinations of system components may be used.

According to certain non-limiting embodiments of the present technology, before a request is transmitted to the application content server 120 from the client device 150, the data analysis server 160 may be configured to identify the client device 150 by analyzing a device-web application-environment associated therewith so as to determine the legitimacy of the request submitted via the web application 140 to the application content server 120. In other words, to identify the client device 150 (and thus the user thereof), the data analysis server 160 may be configured to analyze a current user environment associated with the client device 150, as will be described below.

Further, in some non-limiting embodiments of the present technology, in the event that the client device 150 has been previously identified by the data analysis device 160, the data analysis server 160 may be configured to retrieve data of the client device 150, even if no previous requests have been submitted to the application content server 120 from the web application 140 run on the client device 150. For example, in these embodiments, the data of the client device 150 may include data indicative of whether the client device 150 has ever been compromised by the cyber attack and/or belongs to a fraudster.

How the data analysis server 160 may be configured to determine if the client device 150 is being compromised by the cyber attack or operated by the (legitimate) user thereof, according to certain non-limiting embodiments of the present technology, will be discussed immediately below with reference to FIGS. 3 and 4.

Method

Figure 3:
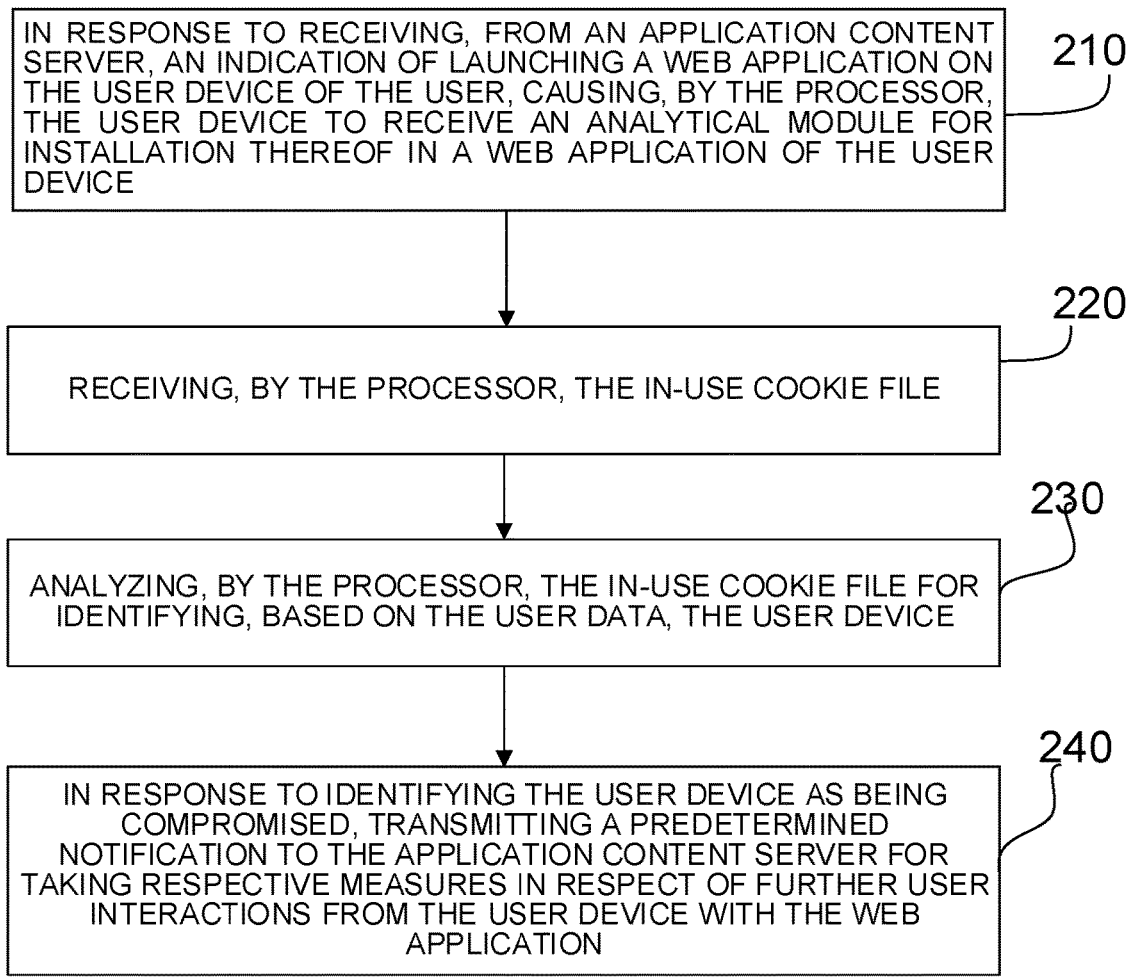
FIG. 3 depicts a flowchart of a method a method for user identification of the user based on the current user environment thereof, in accordance with certain non-limiting embodiments of the present technology.

Thus, with reference to FIG. 3, there is provided a flowchart of a method 200 of user identification of the user of the client device 150 based on the current user environment associated therewith, in accordance with certain non-limiting embodiments of the present technology. In some non-limiting embodiments of the present technology, the method 200 may be executed by a processor 501 of the computing environment 500 being part of one of the data analysis server 160 and the identification server 170. It should be noted that, in some non-limiting embodiments of the present technology, one or more steps of the method 200 may be omitted, repeated, and/or performed in a different order. Accordingly, the particular arrangement of the steps of the method 200 as depicted in FIG. 3 should not be construed as limiting the scope of the present technology.

Step 210: In Response to Receiving, from an Application Content Server, an Indication of Launching a Web Application on the User Device of the User, Causing, by the Processor, the User Device to Receive an Analytical Module for Installation Thereof in a Web Application of the User Device The method 200 commences at step 210 with the processor 501 being configured to embed a library of the analytical module 180 (JSM) into the web application 140 of the client device 150 followed by initializing the web application 140. It should be noted that the logic of the web application 140 itself is not considered in this case; it can be any logic. Furthermore, no explicit additional software installation is performed on the client device 150.

During user interaction with an interface of the web application 140, the analytical module 180 thus initialized may be configured to establish a connection with the data analysis server 160, wherein, in some non-limiting embodiments of the subject technique, the connection with the data analysis device 160 may either be direct or via the infrastructure of the web service provider 110.

Figure 4:
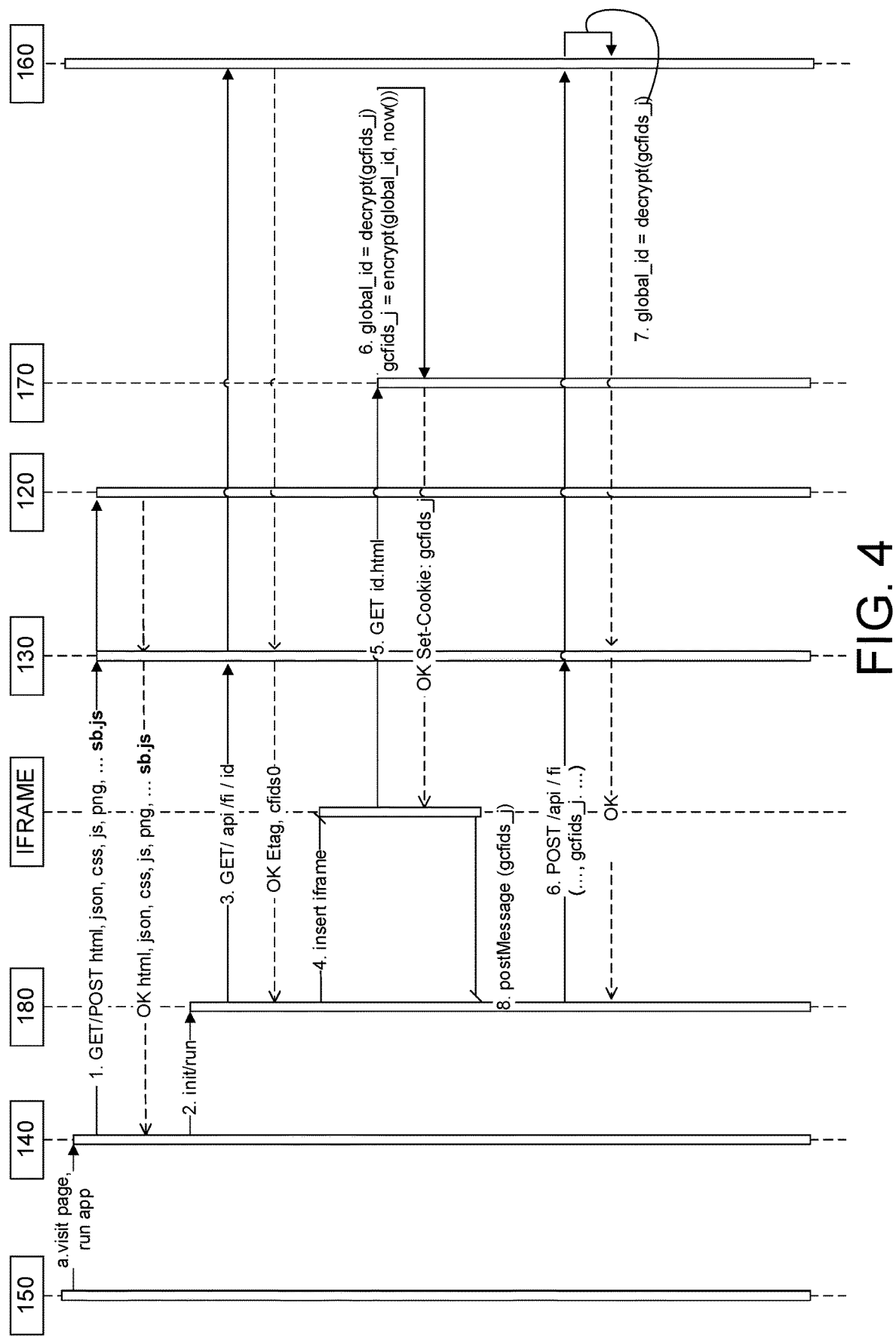
FIG. 4 depicts a time diagram of executing steps of the method of FIG. 3, in accordance with certain non-limiting embodiments of the present technology.

As a non-limiting example, FIG. 4 schematically depicts a time diagram illustrating how the user launches the web application 140, for example, by entering a URL (such as www.Bank.A.ru) in the web application 140. Further, the web application 140 sends a GET request to the web service provider 110 represented in this diagram by the application content 120 and the traffic balancer 130. In response to the request, the application content server 120 provides a web page containing the analytical module 180. The analytical module 180 may further be caused, by the processor 501, to initialize in the web application 140 on the client device 150.

Further, once the analytical module 180 has been initialized, according to some non-limiting embodiments of the present technology, it may further be configured to load and install an iframe container onto the web page.

According to some non-limiting embodiments of the present technology, the iframe container generates an invisible frame of a predetermined size inside a typical HTML document, such as the web page opened in the web application 140, which enables document exchange with the user by uploading documents thereto. More specifically, in accordance with certain non-limiting embodiments of the present technology, the processor 501 can be configured to organize document exchange between the client device 150 at least one of the data analysis server 160 and the identification server 170, as will be discussed below.

Thus, when the iframe container is installed in the web application 140, and in response to the web application 140 receiving content from the application content server 120, the iframe container may receive content from the data analysis device 170.

More specifically, as illustrated by the time diagram of FIG. 4, in some non-limiting of the present technology, the analytical module 180 may be configured to embed the iframe container in DOM (in HTML) of the web page by means of INSERT frame.

Further, in some non-limiting embodiments of the present technology, the iframe container can be disposed outside an authorized area of the web page, where confidential and personal data of the user cannot present, which may guarantee the user that such data will not be transferred to a third-party resource.

It is further worth noting that, from the point of view of the arrangement of the system 100, a session begins to be analyzed from a moment when the user enters the web page via the web application 140 and ends only after all of the tabs thereof are closed, which is an important difference from how the concept of a session is viewed, for example, by a typical payment system: when it comes to the latter, the session starts from a moment when the user logs into an online bank and ends following the "exit" command, which may be ineffective in terms of detecting fraudulent transactions.

Further, as mentioned above, in some non-limiting embodiments of the present technology, the analytical module 180 may be configured to transmit, via the iframe container, to the identification server 170 (for example, without limitation, of the form *.id.group-ib.com), at least one cookie file including a cookie value (gcfids) if it has been previously received during an earlier session of operating the web application 140 with a resource that employs the method disclosed herein. However, in other non-limiting embodiments of the present technology, in an initial state, that is, when the client device 150 has not previously interacted with the infrastructure of the web service 110, the cookie value is absent and is not transferred.

It is further worth noting that the implementation of the present technology enables unambiguous identification of the client devices 150 on a global scale and in full compliance with local legislations of individual countries and macroregions, since client devices can be globally identified on a third-level domain (for example, id.group-ib.com), whereas a fourth-level domain (for example, sg.id.group-ib.com) may be used for local identification of the client devices within a given region. Servers that correspond to *.id.group-ib.com domains may be disposed in a particular country or belong to a particular web service. Further, some non-limiting embodiments of the present technology may be practical in overcoming the restrictions on storing cookies by default of some web applications (for example, Chrome, Mozilla Firefox).

By way of example, and not as a limitation: the server ru.id.group-ib.com may be physically located in Russia, and the server us.id.group-ib.com may be physically located in the United States; whereas at the lower level, id.group-ib.com, it is one domain, which helps to implement the present technology by means of cross-domain cookie file exchange through the iframe container.

Thus, in some non-limiting embodiments of the present technology, the identification server 170 (for example, *.id.group-ib.com) may be configured to receive the at least one cookie file and decrypt it to obtain a current tuple including at least one previously issued user device identifier of the client device 150 and a time stamp of generation of the cookie value of the at least one cookie file. Further, the identification server 170 may be configured to generate a new tuple with the previous device identifier and with a new time stamp and encrypt them, thereby generating an in-use cookie file (gcfids).

That is, as illustrated by the time diagram of FIG. 4, before the identification server 170, for example, *.id.group-ib.com transfers the at least one cookie file (gcfids), received from the client device 150, back to the iframe container, the identification server 170 may be configured to update it by adding the new time stamp. Such a mechanism for updating the at least one cookie file may provide resistance to interception and external use of cookie files from the client device 150. This process can be described, for example, as gcfids(n+1)=encrypt(decrypt(gcfids(n), timestamp)), where gcfids (n) is a cross-session cookie of the client device 150, encrypt/decrypt is an encryption/decryption function, timestamp is a time stamp. Any algorithm known in the art, for example, AES may be used as an encryption/decryption method.

In some non-limiting embodiments of the present technology, the identification server 170 may further be configured to assign to the client device 150 an individual UUID (Universally Uniquely Identifier), which can then be used by the data analysis server 160.

Thus, the in-use cookie file (gcfids) obtained by the iframe container can further be transferred to the analytical module 180, which may further be used, by the processor 501, to identify the client device 150 and global environment thereof. A similar operation can be performed using a standard that provides for sending a javascript message from one window to another window by way of a special call window.postMessage(gcfids).

Further, according to some non-limiting embodiments of the present technology, the analytical module 180 may be configured to transfer the in-use cookie file (gcfids) from the client device 150 to the data analysis server 160.

The method 200 thus proceeds to step 220.

Step 220: Receiving, by the Processor, the In-Use Cookie File

Further, at step 220, according to certain non-limiting embodiments of the present technology, the processor 501 of the data analysis server 160 can be configured to receive the in-use cookie file and, based thereon, may further be configured to identify the client device 150 on the global scale.

In some non-limiting embodiments of the present technology, the data analysis server 160 may be disposed, for example, both in the cloud and in the infrastructure of the web service provider 110, and there may be several such servers located in different countries or regions, as well as there may be multiple servers similar to the identification servers 170 (*.id. group-ib.com).

The method 200 hence advances to step 230.

Step 230: Analyzing, by the Processor, the In-Use Cookie File for Identifying, Based on the User Data, the User Device Thus, at step 230, in some non-limiting embodiments of the present technology, the processor 501, during processing the in-use cookie file from the client device 150, may be configured to generate a unique profile indicative of the current user environment associated with the client device 150. By way of example, and not as a limitation, the unique profile may include at least one of: digital fingerprints of the web application 140, network features, and user behavioral habits of the user.

Thus, in some non-limiting embodiments of the present technology, data of the digital fingerprints of the web application 140 may include at least one of:

Data of a User-Agent application associated with the client device 150, which can be used to determine a version of the web application 140, an OS version and some of add-ons installed therein. It should further be noted that in cases where the user-agent application is absent or it is necessary to check correctness thereof, the version of the web application 140 can be further determined by checking for the presence of certain functions or features implemented or changed between releases of web application 140.

System clock time of the client device 150. For example, if the client device 150 does not synchronize the clock thereof with a third-party time server, then there may be a difference between the real and the system time of the client device 150, which is measured with microsecond precision using scripts.

data of at least one of CPU (Central Processing Unit) and GPU (Graphics Processing Unit) of the client device 150, which may be obtained both directly (using the GL RENDERER function) and by means of benchmarks and tests implemented using scripts.

A monitor resolution and a window size of the web application 140, including second monitor parameters for cases where the client device 150 includes a multi-monitor system.

List of fonts installed on the client device 150, which are obtained, for example, using API.

List of all installed plugins, ActiveX controls, Browser Helper Objects, including versions thereof, it should be further noted that data of at least some plugins may be obtained from HTTP headers.

Information about installed extensions and other software, for example, ad blockers that cause certain changes to the pages being viewed, by which changes one can determine what a given extension is and some of its settings.

Further, the processor 501 can be configured to obtain information about the network features of the local network architecture associated with the client device 150 and settings of network protocols, which may include, for example, without limitation: an external IP address, numbers of ports for outgoing TCP/IP connections, a local IP address for users behind NAT or HTTP proxy, and information about proxy servers used by the client device 150, which can be obtained from the HTTP header. It should be noted that such features are common to many web applications, in particular to the browsers installed on the client device 150, and cannot be hidden by privacy settings or some utility applications.

Further, in some non-limiting embodiments of the present technology, the processor 501 can be configured to obtain data of behavioral habits of the user of the client device 150, including, without limitation: a preferred language of the operating system installed on the client device 150, a default encoding and a time zone, data in the cache of the web application 140 on the client device 150 and log history data thereof, mouse gestures, a frequency and a duration of keystrokes, data from an accelerometer of the client device 150, any changes to standard website fonts and sizes thereof, zoom level, use of special features, such as a text color, a size, and a state of certain functions or features of the web application 140 configurable by the user, including, for example: blocking of third-party cookies, DNS prefetching, pop-up blocking, Flash security settings, etc.

In additional non-limiting embodiments of the present technology, the processor 501 may further be configured to obtain additional information. The additional information may include data stored in a database of the data analysis server 160, which is compiled during the operation of the identification server 170, as well as during possible connection of external systems. Thus, such information may include data pertaining to the compromised organization accounts and devices in various IT systems, bank cards, SIM cards, current activity of criminal groups and characteristics of most active malware in a given region, signs of cyber attacks and fraudulent schemes and much more.

Thus, when the processor 501 of the data analysis server 160 on its side receives information about the client device 150 and the current user environment thereof, the processor 501 can be configured to check this information to determine if the device 150 is compromised and/or marked as fraudulent (for example, previously, when working in another web application in another country) or operated by the user. To that end, in some non-limiting embodiments of the present technology, the processor 501 can be configured to apply one or more decision rules and/or machine learning algorithms run thereby to make a respective conclusion about the safety of the client device 150 for the infrastructure of the web service 110.

The method 200 thus proceeds to step 240.

Step 240: In Response to Identifying the User Device as being Compromised, Transmitting a Predetermined Notification to the Application Content Server for Taking Respective Measures in Respect of Further User Interactions from the User Device with the Web Application Thus, at step 240, according to some non-limiting embodiments of the present technology, in response to identifying the client device 150 as being compromised, the processor 501 can further be configured to transmit a predetermined notification to the application content server 120.

In this regard, in some non-limiting embodiments of the present technology, the application content server 120 may be configured to implement data protection measures. For example, the data protection may include blocking the request and/or operations from the client device 150 having been identified as compromised.

Furthermore, it is worth noting that, in some non-limiting embodiments of the present technology, the data analysis server 160 may be integrated with security systems disposed in the infrastructure of the web service provider 110. For example, if an internal security system is already deployed in the infrastructure of the web service provider of the application content server 120, then the processor 501 may be configured to send data indicative of the client device 150 being compromised to both directly to the internal security system for real-time enrichment of data contained therein and, in general, to the application content server 120. In the first case, such data may be used as basis for the formation of deciding verdicts by the internal security system of the web service provider 110, for example, a bank, to make a decision on a current transaction deriving from the client device 150. Furthermore, to implement the functionality described above, the system 100 may support RESTful API that may be used in poll mode, as well as a queue mechanism through which decisions may be delivered in push mode.

The method 200 thus terminates.

Computing Environment

Figure 5:
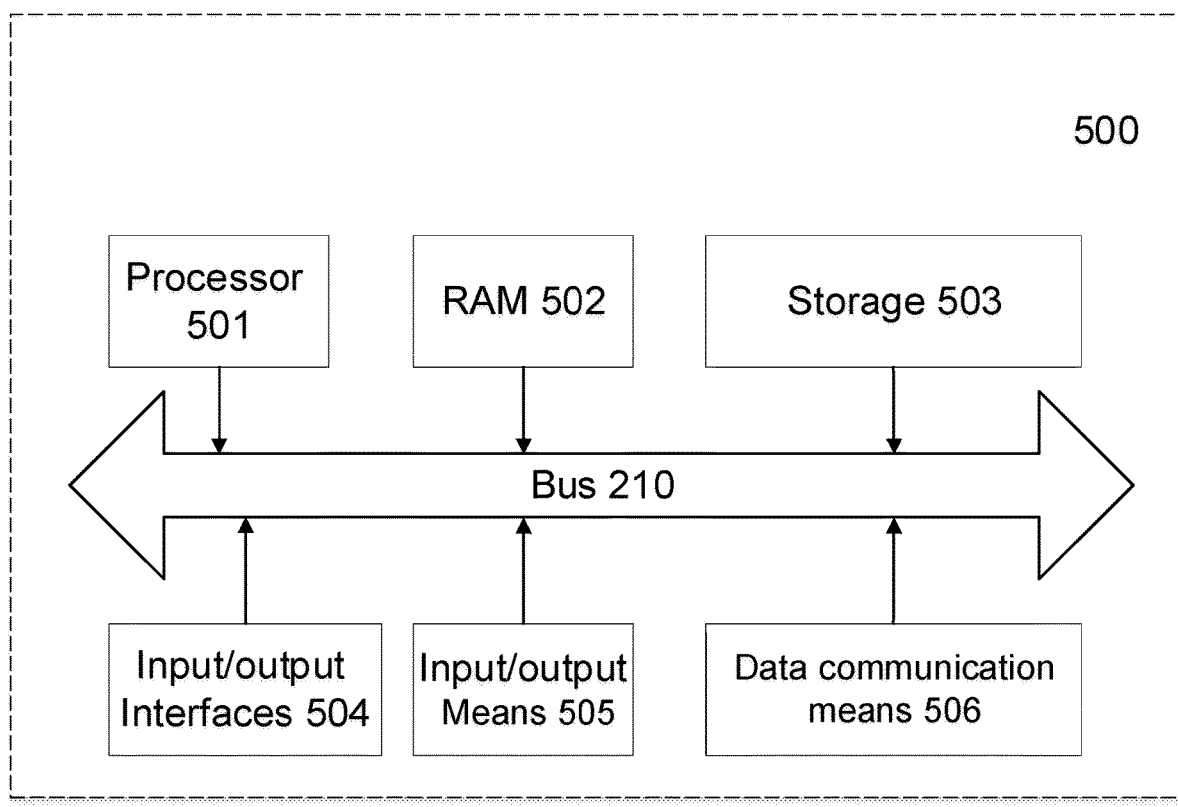
FIG. 5 depicts a schematic diagram of an example computing environment configurable for executing the method of FIG. 3, in accordance with certain non-limiting embodiments of the present technology.

With reference to FIG. 5, there is depicted an example functional diagram of the computing environment 500 configurable to implement certain non-limiting embodiments of the present technology including the method 200 described above.

In some non-limiting embodiments of the present technology, the computing environment 500 may include: the processor 501 comprising one or more central processing units (CPUs), at least one non-transitory computer-readable memory 502 (RAM), a storage 503, input/output interfaces 504, input/output means 505, data communication means 506.

According to some non-limiting embodiments of the present technology, the processor 501 may be configured to execute specific program instructions the computations as required for the computing environment 500 to function properly or to ensure the functioning of one or more of its components. The processor 501 may further be configured to execute specific machine-readable instructions stored in the at least one non-transitory computer-readable memory 502, for example, those causing the computing environment 500 to execute the method 200.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scrips or XML. Various algorithms are implemented with any combination of the data structures, objects, processes, procedures and other software elements.

The at least one non-transitory computer-readable memory 502 may be implemented as RAM and contains the necessary program logic to provide the requisite functionality.

The storage 503 may be implemented as at least one of an HDD drive, an SSD drive, a RAID array, a network storage, a flash memory, an optical drive (such as CD, DVD, MD, Blu-ray), etc. The storage 503 may be configured for long-term storage of various data, e.g., the aforementioned documents with user data sets, databases with the time intervals measured for each user, user IDs, etc.

The input/output interfaces 504 may comprise various interfaces, such as at least one of USB, RS232, RJ45, LPT, COM, HDMI, PS/2, Lightning, FireWire, etc.

The input/output means 505 may include at least one of a keyboard, joystick, (touchscreen) display, projector, touchpad, mouse, trackball, stylus, speakers, microphone, and the like. A communication link between each one of the input/output means 505 can be wired (for example, connecting the keyboard via a PS/2 or USB port on the chassis of the desktop PC) or wireless (for example, via a wireless link, e.g., radio link, to the base station which is directly connected to the PC, e.g., to a USB port).

The data communication means 506 may be selected based on a particular implementation of the network, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 504 may be configured for wired and wireless data transmission, via one of WAN, PAN, LAN, Intranet, Internet, WLAN, WMAN, or GSM networks.

These and other components of the computing environment 500 may be linked together using a common data bus 510.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for user identification of a user device of a user based on a current user environment, the method being executable by a server including a processor communicatively couplable, via a communication network, with the user device of the user, the method comprising:
    in response to receiving, from an application content server, an indication of launching a web application on the user device of the user, causing, by the processor, the user device to receive an analytical module for installation thereof in the web application of the user device, the analytical module being configured to execute:
        causing installation of an iframe container in a given page of the web application;
        retrieving, from the user device, user data indicative of the current user environment of the user device, the user data unambiguously identifying the user device;
        generating, based on the user data, at least one cookie file;
        transmitting, via the iframe container, the at least one cookie file to at least one identification server for modification thereof to generate an in-use cookie file; and
    receiving, by the processor, the in-use cookie file;
    analyzing, by the processor, the in-use cookie file for determining, based on the user data, a unique user device profile of the user device,
        the determining including at least one of a global identification of the user device on a third-level domain and a local identification of the user device within a region on a fourth-level domain;
    in response to determining that the unique user device profile is indicative of the user device being compromised, transmitting, by the processor, a predetermined notification to the application content server for taking respective measures in respect of further user interactions from the user device with the web application.

2. The method of claim 1, wherein the modification of the at least cookie file comprises adding a time stamp to the at least one cookie and further re-encryption thereof.

3. The method of claim 1, wherein the iframe container is installed in the given page outside of an authorized zone of the web application.

4. The method of claim 1, wherein the iframe container is configured for cross-domain exchange of cookie files.

5. The method of claim 1, wherein the at least one cookie file is further analyzed on a global data analysis server for generating a global identification profile of the current user environment of the user device.

6. The method of claim 1, wherein the global identification profile includes data indicative of at least one of: data of digital fingerprints of the web application, network features of the communication network, and user behavioral habits of the user.

7. The method of claim 6, wherein the data of the digital fingerprints of the web application includes information of at least one of: a User-Agent application on the user device, time of a system clock of an operating system installed on the user device, a CPU and a GPU of the user device, a monitor resolution and window size associated with the web application, a list of fonts installed in the operating system, a list of all plugins installed in the operating system, and web application extensions in the web application.

8. The method of claim 6, wherein the data of the network features of the communication network includes at least one of: information of a local network architecture and information of settings of network protocols.

9. The method of claim 6, wherein the data of the user behavioral habits of the user include at least one of: a preferred interface language of the operating system, an operating system encoding and a time zone, data in a cache of the web application on the user device and log history thereof, mouse gestures, frequency and duration of keystrokes, data from an accelerometer of the user device, changes to standard fonts and sizes thereof of the web application, changes to a standard scale of the web application and/or elements thereof, use of special features including at least one of: text colors, size, data of settings of the web application including data of at least one of: blocking of third-party cookies, DNS prefetching, pop-up blocking, and Flash security settings.

10. The method of claim 1, wherein the analytical module is a Java Script module.

11. The method of claim 1, wherein the application content server is further configured to restrict the further user interactions from the user device with the web application.

12. A system for user identification of a user device of a user based on a current user environment, the system including a server further including:
- a processor communicatively couplable, via a communication network, with a user device of the user;
- a non-transitory computer-readable medium storing instructions; and
- the processor, upon executing the instruction being configured to:
  - in response to receiving, from an application content server, an indication of launching a web application on the user device of the user, cause the user device to receive an analytical module for installation thereof in a web application of the user device, the analytical module being configured to execute:
    - causing installation of an iframe container in a given page of the web application;
    - retrieving, from the user device, user data indicative of the current user environment of the user device, the user data unambiguously identifying the user device;
    - generating, based on the user data, at least one cookie file;
    - transmitting, via the iframe container, the at least one cookie file to at least one identification server for modification thereof to generate an in-use cookie file; and
  - receive the in-use cookie file;
  - analyze the in-use cookie file for determining, based on the user data, a unique user device profile of the user device,
    - the determining including at least one of a global identification of the user device on a third-level domain and a local identification of the user device within a region on a fourth-level domain;
  - in response to determining that the unique user device profile is indicative of the user device being compromised, transmit a predetermined notification to the application content server for taking respective measures in respect of further user interactions from the user device with the web application.

* * * * *